United States Patent Office 3,590,020
Patented June 29, 1971

3,590,020
SILICONE RUBBER CURED BY DINITROSO AROMATIC COMPOUNDS
Gideon Levin, Midland, Mich., assignor to Dow Corning Corporation, Midland, Mich.
No Drawing. Filed Aug. 25, 1967, Ser. No. 663,248
Int. Cl. C08g *31/02*
U.S. Cl. 260—46.5      3 Claims

ABSTRACT OF THE DISCLOSURE

A composition curable to a silicone rubber resulting from a mixture of an organosilicon polymer and a dinitroso aromatic compound.

---

The present invention relates to a curable organosilicon polymer composition of an organosilicon polymer and a dinitroso aromatic compound.

It is known that p-dinitrosobenzene vulcanizes certain organic compounds to provide elastomers. For example, U.S. Pat. No. 2,419,976 shows that p-dinitrosobenzene vulcanizes organic elastomers. Great Britain patent specification No. 587,830 shows that m- or p-dinitrosobenzene are useful as activators in a butyl rubber vulcanization. U.S. Pat. No. 2,616,876 shows that m-dinitroso aromatic compounds vulcanize natural and synthetic organic elastomers. U.S. Pat. No. 2,822,342 shows that dinitroso aromatic compounds can be used to vulcanize butyl rubber. U.S. Pat. No. 3,053,712 shows that chlorinated natural rubber can be cured by dinitroso aromatic compounds. Great Britain patent specifications Nos. 873,358 and 873,359 show that halogenated natural and synthetic unsaturated rubbers can be vulcanized by dinitroso aromatic compounds. All of the foregoing patents show that organic rubbers containing carbon-carbon unsaturation are vulcanizable by dinitroso aromatic compounds.

Further, it has been shown by U.S. Pats. Nos. 3,061,594 and 2,922,804 that unsaturated organic rubbers both natural and synthetic have been vulcanized with a basic lead p-nitrosophenolate. These patents also suggest that the basic lead p-nitrosophenolate can be used to vulcanize silicone rubber. However, it is known that lead is one of the most active catalytic metals known in the field of silicones, if not the most active, as shown by U.S. Pat. No. 2,449,572. Likewise, bases are also well-known catalysts in silicone chemistry. Therefore, a basic lead compound would be expected to have a pronounced effect on a silicone rubber.

It was totally unexpected that a vulcanizing agent for unsaturated organic elastomers would vulcanize a saturated organosilicon polymer to an elastomer.

An object of this invention is therefore to provide a curable composition of an organosilicon polymer and a dinitroso aromatic compound. Another object of this invention is to provide a method for vulcanizing an organosilicon polymer with a dinitroso aromatic compound. These and other objects will become apparent from the following detailed description of the present invention.

The present invention relates to a curable composition consisting essentially of an organosilicon polymer having an average of 1.9 to 2.1 monovalent organic radicals per silicon atom wherein each of said monovalent organic radicals is selected from the group consisting of hydrocarbon radicals, halogenated hydrocarbon radicals and cyanoalkyl radicals, the silicon atoms being linked by divalent radicals selected from the group consisting of oxygen atoms, hydrocarbon radicals and halogenated hydrocarbon radicals and at least 0.001 weight percent based on the weight of the organosilicon polymer of a dinitroso aromatic compound.

The organosilicon polymers (A) can be any of the conventional organosilicon polymers. The polymers of this composition are well known in the art and many of the polymers can be purchased commercially.

The organosilicon polymers of this invention have monovalent organic radicals bonded to the silicon atoms. The number of monovalent organic radicals per silicon atom range from an average of 1.9 to 2.1 inclusive. These organosilicon polymers are composed of silicon-containing units with 1, 2 or 3 monovalent organic radicals per silicon atom bonded through silicon-carbon bonds. Limited amounts of $SiO_2$ units are also within the scope of this invention.

The organosilicon polymers can be composed of silicon-containing units of the formulae $RSiX_{3/2}$, $R_2SiX_{2/2}$, $R_3SiX_{1/2}$, or $SiX_{4/2}$ wherein R is a monovalent organic radical selected from the group consisting of hydrocarbon radicals, halogenated hydrocarbon radicals and cyanoalkyl radicals and X is a divalent radical selected from the group consisting of oxygen atoms, hydrocarbon radicals and halogenated hydrocarbon radicals. The divalent radicals are bonded to other silicon atoms and if X is a divalent oxygen atom, it can also be bonded to hydrogen or organic groups to form groups such as,

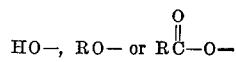

When the number of monovalent organic radicals per silicon atom ranges from 1.9 to 2.1, the organosilicon composition is an elastomeric material.

These monovalent organic radicals can be hydrocarbon radicals such as: alkyl radicals such as methyl, ethyl, cyclopentyl, propyl, isopropyl, hexyl, dodecyl, octadecyl, myricyl, 2-methyl-3-ethylhexyl, cyclohexyl, 2-methylcyclohexyl, 2-ethylhexyl and tertiarybutyl; alkenyl radicals such as vinyl, allyl, 1-butenyl, 1-hexenyl, cyclohexenyl, octadecenyl, 2-methylbutenyl-3 and 1,4-butadienyl; aryl radicals such as, phenyl, anthracyl, tolyl, xylyl, xenyl, naphthyl, benzyl, phenylethyl, isopropylphenyl, 3-phenyldodecyl, styryl and methylnaphthyl; halogenated hydrocarbon radicals, such as, haloalkyl such as, chloromethyl, bromoethyl, 3,3,3-trifluoropropyl, 3,3,4,4,5,5,5-pentafluoropentyl, 3,8-dichlorodecyl, 2-iodooctadecyl, chlorobutyl, 4,5-dichlorohexyl, alpha-chloroethyl, alpha-gamma-dichloropropyl, iodomethyl, 3,6-dichlorohexyl, polychlorinated cyclohexyl, polychlorinated octadecyl, heptafluoropropyl and 3,3-dichloro-4-fluorobutyl; haloalkenyl such as, 1,2,2-trifluorovinyl, chlorohexafluorocyclopentenyl, 2-chlorovinyl, 1,3-dichloroallyl, 2-(trifluoromethyl)-butenyl-3, chlorodifluorovinyl and 5-iodooctadecenyl-11; haloaryl radicals, such as, chlorophenyl, $\alpha,\alpha,\alpha$-trifluorotolyl, hexafluoroxylyl, heptachloroxenyl, bromoxenyl, iodonaphthyl, dichlorobenzyl and perfluoroisopropylphenyl; and cyanoalkyl radicals such as, cyanomethyl, $\beta$-cyanoethyl, gamma-cyanopropyl, $\beta$-cyanopropyl, gamma-cyanopentyl, $\omega$-cyanopentyl, $\omega$-cyanooctadecyl, and gamma-cyanooctyl.

The silicon atoms of the organosilicon polymers are linked by divalent radicals such as oxygen atoms; hydrocarbon radicals such as, methylene, ethylene, butylene, isopropylene, octylene, octadecylene, phenylene, tolylene, 4,4'-biphenylene, 4,4'-diphenylether, p-xylylene, 4,4'-dimethylenediphenylether; and halohydrocarbon radicals such as, dichloromethylene, tetrafluoroethylene, bromobutylene, dichlorophenylene, and 4,4'-dimethylene(2,2'-diiodo)diphenylether.

The organosilicon polymers of this invention can contain, for example, siloxane units such as dimethylsiloxane, monomethylsiloxane, trimethylsiloxane, diethylsiloxane, monoethylsiloxane, triethylsiloxane, ethyldimethylsiloxane, ethylmethylsiloxane, siliconeopentylmethylsiloxane, siliconeopentylethylsiloxane, bis - siliconeopentylsiloxane, phenylmethylsiloxane, phenylsiloxane, triphenylsiloxane, phenylethylsiloxane, diphenylsiloxane, siliconeopentylphenylsiloxane, monovinylsiloxane, α,α,α - trifluorotolylmethylsiloxane, chlorophenylmethylsiloxane, chloromethylmethylsiloxane, chloromethylsiloxane, bis-chloromethylsiloxane, bis - alphachloroethylsiloxane, alphachloroethylmethylsiloxane, bis - bromomethylsiloxane, octadecylbutylsiloxane, 6 - chlorohexylmethylsiloxane, cyclohexylmethylsiloxane, 3,4,5 - trichloropentylphenylsiloxane, vinylmethylsiloxane, divinylsiloxane, allylmethylsiloxane, diallylsiloxane, hexenylphenylsiloxane, vinylethylsiloxane, monooctadecenylsiloxane, trifluorovinylmethylsiloxane, β - cyanoethylphenylsiloxane, xenylmethylsiloxane, chlorophenylmethylsiloxane, benzylmethylsiloxane, allyloctadecylsiloxane, allylsiloxane, dimethylvinylsiloxane, phenylmethylvinylsiloxane, monopropylsiloxane, dipropylsiloxane, propylphenylsiloxane, 3,3,3 - trifluoropropylmethylsiloxane, mono - gamma-chloropropylsiloxane, monocyclohexylsiloxane, monodichlorophenylsiloxane, phenyl-3,3,3 - trifluoropropylsiloxane, monotolylsiloxane, monobenzylsiloxane, monocyanomethylsiloxane, and ω-cyanooctylmethylsiloxane.

Examples of organosilicon polymer units which contain divalent hydrocarbon and divalent halohydrocarbon radicals are

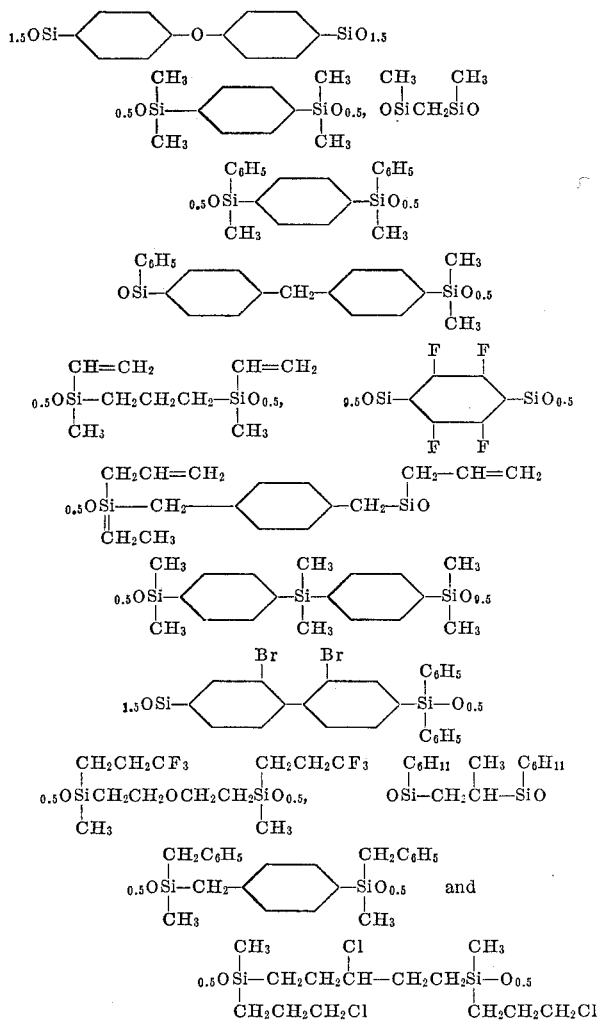

The preferred organosilicon polymer is a diorganopolysiloxane which has a general unit formula $R_nSiO_{4/2}$ wherein R is a monovalent radical selected from alkyl, aryl, halogenated alkyl, halogenated aryl, alkenyl and halogenated alkenyl and $n$ has an average value of 1.9 to 2.1 inclusive, preferably $n$ has an average value of 1.98 to 2.05 inclusive. The monovalent radicals are defined above. The most preferred diorganopolysiloxanes are those in which the organic radicals are monovalent aliphatic hydrocarbon radicals.

All of the foregoing organosilicon polymers are well known and many are commercially available. The art contains numerous references to organosilicon polymers within the scope of the present invention. A number of references are listed below which include organosilicon polymers within the scope of the present invention. The references also include fillers and additives which can be used in the present curable composition. The references are:

U.S. Patent Nos. 2,457,677, 2,480,822, 2,562,000, 2,721,857, 2,723,964, 2,759,904, 2,803,619, 2,819,236, 2,927,908, 2,982,757, 2,999,076, 3,002,951, 3,006,878, 3,024,214, 3,032,530, 3,046,294, 3,050,492, 3,061,565, 3,065,201, 3,086,954, 3,160,601, 3,162,663, 3,192,181, 3,202,634, 3,209,018, 3,222,320, 3,243,410, 3,269,984, 3,294,740. Canadian Patent Nos. 539,889, 546,861 and 677,876 and British Patent No. 781,279.

The dinitroso aromatic compound is mixed with the organosilicon polymer in an amount of at least 0.001 weight percent based on the weight of the organosilicon polymer, preferably an amount of from 0.1 to 10 weight percent is used.

The dinitroso aromatic compounds are well known in the art and can be obtained commercially, see U.S. Patent No. 3,053,712.

The dinitroso aromatic compound is an organic compound having two nitroso groups on an aromatic ring consisting of carbon atoms and any other substituent on the aromatic ring is selected from hydrogen atoms, halogen atoms, such as fluorine, chlorine, bromine and iodine, alkyl radicals such as defined above, alkoxy radicals, such as methoxy, ethoxy, propoxy, isopropoxy, butoxy, tertiarybutoxy, hexoxy, octadecoxy and aryl radicals as defined above.

Examples of the dinitroso aromatic compound include p-dinitrosobenzene, m-dinitrosobenzene, 2,5 - dinitrosotoluene, 2,5 - dinitroso-p-cymene, 1,2 - dinitrosonaphthalene, dinitrosoresorcinol, dinitrosoörcinol,

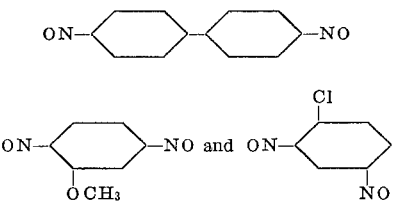

The curable compositions of this invention can be prepared in any conventional mixing procedure, such as by hand mixing, machine mixing such as by milling or by solution in organic solvents, and the like. The mixing should be thorough enough to provide a reasonably homogeneous mixture for best results.

The above curable composition cures at room temperature, however, the curing process is slow and therefore not practical for most purposes. The composition of this invention can be cured over a wide variety of temperatures.

This invention also relates to a method for preparing a silicone elastomer comprising mixing an organosilicon polymer having an average of 1.9 to 2.1 monovalent organic radicals per silicon atom wherein each of said monovalent organic radicals is selected from the group consisting of hydrocarbon radicals, halogenated hydrocarbon radicals and cyanoalkyl radicals, the silicon atoms being linked by divalent radicals selected from the group consisting of oxygen atoms, hydrocarbon radicals and halogenated hydrocarbon radicals and at least 0.001 weight percent based on the weight of the organosilicon polymer of a dinitroso aromatic compound and thereafter heating the resulting mixture to a temperature from 100° to 300° C. inclusive for at least one minute, whereby a silicone elastomer is obtained.

The mixing of the organosilicon polymer and the dinitroso aromatic compound can be done by any of the methods described above. After the ingredients have been mixed the mixture is then heated to a temperature of 100° to 300° C. inclusive for a period of at least one minute. It is preferable to heat the mixture for at least 5 minutes to 24 hours at 150° C. to 250° C. However, the most practical time ranges from 1 to 5 hours. The heating can be done by press vulcanization processes, by hot air vulcanization or by other means of vulcanization known in the art for silicone rubber.

Other than the organosilicon polymer as described above, other additives and fillers can be added. Additives can be, for example, antioxidants, plasticizers, compression set additives, additives for improving the storage life of the unvulcanized compositions and other conventional additives used in silicone compositions. Conventional fillers used in silicone compositions can be used in the present compositions, such filler can be either untreated or treated with organosilanes or organosiloxanes. Examples of filler are, glass, diatomaceous earth, crushed quartz, clays, fume silica, precipitated silica, zirconium silicate, magnesium silicate, lithium silicates, aluminum silicates, iron oxide, magnesium oxide, titanium dioxide, calcium carbonate, metals, silicone resins and organic resins. The fillers and other additives as described in the patents listed above for showing organosilicon polymers are within the scope of this invention. The compositions as described, excluding any catalyst, and within the scope of the present invention can be used. The concept of using other vulcanization catalysts in combination with dinitroso aromatic compounds to cure organosilicon polymers is within the scope of the present invention.

The curable compositions of the present invention can be molded, shaped and processed in a number of ways to provide useful silicone rubber articles. The compositions are useful for injection molding, extruding, coating, laminating and molding; therefore, a wide variety of useful articles can be obtained. The compositions of the present invention are particularly useful for extruding process since they have the advantage of not scorching during the extruding process.

The following examples are illustrative only and are not to be construed as limiting the invention which is properly delineated in the appended claims.

EXAMPLE 1

A mixture was prepared by milling on a cold two-roll mill 30 g. of a polydimethylsiloxane gum, 18 g. of a trimethylsiloxy-treated silica and 2 g. of p-dinitrosobenzene. The resulting mixture was press vulcanized at 175° C. for 15 minutes and then the sample was removed and heated in an air circulating oven for 1 hour at 200° to 230° C. The vulcanized product was a silicone elastomer having 710 p.s.i. tensile strength at break and 1,100% elongation at break.

A portion of the above mixture cured after standing at room temperature for 3 months.

For purposes of comparison, the above procedure was repeated except the p-dinitrosobenzene was left out. After 1 hour at 200° to 230° C. no curing was observed.

EXAMPLE 2

When a mixture is prepared by milling 100 parts by weight of a polydimethylsiloxane gum containing 0.25 mol percent methylvinylsiloxane units and 0.5 part by weight p-dinitrosobenzene, and then cured for 5 hours at 175° C., a cured silicone elastomeric product is obtained.

EXAMPLE 3

When a composition is prepared by mixing 100 parts by weight of one of the following organosilicon polymers with 10 parts by weight p-dinitrosobenzene and thereafter cured by heating for 3 hours at 200° C., a rubbery solid is obtained.

(A) An organosilicon polymer composed of 0.5 mol percent of

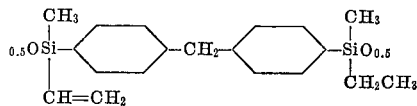

units and 99.5 mol percent $(CH_3)_2$ SiO units, (B) An organosilicon polymer composed of 10 mol percent of

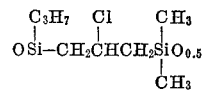

units, 75 mol percent of

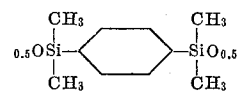

units, 15 mol percent of $(CH_3)_2SiO$ units, (C) An organosilicon polymer composed of 20 mol percent of $(CH_3CH_2)(CH_3)SiO$ units and 79.6 mol percent of

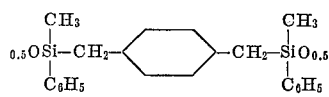

units and 0.4 mol percent of $$CH_2=CHCH_2CH_2(C_6H_5)_2SiO_{0.5}$$

(D) An organosilicon polymer composed of 95 mol percent of

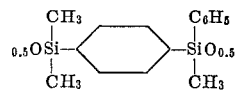

units and 5 mol percent of $(C_6H_5)(CH_3)SiO$ units, (E) An organosilicon polymer composed of 40 mol percent of

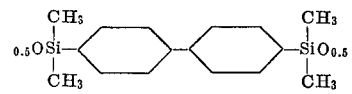

units, 40 mol percent $(C_6H)_2SiO$, 5 mol percent

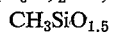

and 15 mol percent $(CH_3)_2SiO$, (F) An organosilicon polymer composed of 7.5 mol percent of phenylmethylsiloxane units, 0.142 mol percent methylvinylsiloxane units and 92.358 mol percent dimethylsiloxane units, and (G) An organosilicon polymer composed of 85 mol percent dimethylsiloxane units, 10 mol percent phenylmethylsiloxane units and 5 mol percent α,α,α-trifluorotolylmethylsiloxane units.

EXAMPLE 4

When 10 parts by weight of a copolymer of 89 mol percent dimethylsiloxane units, 10 mol percent phenylvinylsiloxane units and 1 mol percent of trimethylsiloxane units having a viscosity of 3,240 cs. at 25° C., 100 parts by weight of a polydimethylsiloxane gum, 35 parts by weight of a fume silica, 15 parts by weight of diatomaceous earth, and 1 part by weight of m-dinitrosobenzene are milled together and then vulcanized for 1 hour at 100° C. and thereafter cured for 24 hours at 280° C., a silicone rubber is obtained.

EXAMPLE 5

When 100 parts by weight of a polydimethylsiloxane gum and 15 parts by weight of p-dinitrosobenzene are mixed and thereafter heated for 1 minute at 300° C., a rubbery solid is obtained.

EXAMPLE 6

A silicone rubber is prepared when 100 parts by weight of an organopolysiloxane copolymer consisting of 7.5 mol percent phenylmethylsiloxane units, 0.142 mol percent methylvinylsiloxane units and 92.358 mol percent dimethylsiloxane units, 70 parts by weight of a fume silica filler, 2 parts by weight iron oxide, 0.15 part by weight of boric acid, and 0.9 part by weight of 2,5-dinitrosotoluene are mixed on a two-roll mill, molded for 5 minutes at 200° C. and then cured 24 hours at 250° C.

EXAMPLE 7

A silicone rubber is prepared when 100 parts by weight of a copolymeric organosiloxane comprising 85 mol percent dimethylsiloxane units, 10 mol percent phenylmethylsiloxane units, 4.8 mol percent $\alpha,\alpha,\alpha$-trifluorotolylmethylsiloxane and 0.2 mol percent methylvinylsiloxane units, 35 parts by weight of a fume silica filler, 0.12 part of iron as ferric octoate and 3 parts by weight of 2,5-dinitroso-p-cymene is mixed by milling, molded for 5 minutes at 175° C. and then cured for 20 hours at 120° C.

EXAMPLE 8

A silicone rubber is prepared when 100 parts by weight of a copolymeric organopolysiloxane gum having 92.36 mol percent dimethylsiloxane units, 0.14 mol percent methylvinylsiloxane units and 7.5 mol percent phenylmethylsiloxane units, 20 parts by weight of a copolymer fluid having a viscosity of 111 cs. at 25° C. and having a composition of 28 mol percent dimethylsiloxane units, 10 mol percent methylvinylsiloxane units, 50 mol percent phenylmethylsiloxane units and 12 mol percent trimethylsiloxane units, 5 parts by weight of a copolymer fluid having a viscosity of 658 cs. at 25° C. and composed of 89 mol percent dimethylsiloxane units, 10 mol percent methylvinylsiloxane units and 1 mol percent trimethylsiloxane units, 35 parts by weight of a fume silica, and 5 parts by weight of dinitrosonaphthalene is milled, vulcanized for 20 minutes at 150° C. and then cured for 3 hours at 175° C.

EXAMPLE 9

A silicone rubber is prepared by milling on a two-roll rubber compounding mill, 100 parts by weight of an organopolysiloxane gum consisting of 99.5 mol percent 3,3,3-trifluoropropylmethylsiloxane units and 0.5 mol percent methylvinylsiloxane units, 4.5 parts by weight of a hydroxy-endblocked dimethylpolysiloxane fluid containing 3.15 percent by weight of silicon-bonded hydroxyl radicals, 30 parts by weight of a precipitated silica, 25 parts by weight of polytetrafluoroethylene and 6 parts by weight of p-dinitrosobenzene. This mixture is cured by heating for 24 hours at 236° C.

EXAMPLE 10

A curable composition stock is prepared by milling the following mixture on a two-roll mill: 100 parts by weight of 3,3,3-trifluoropropylmethylpolysiloxane having a Williams plasticity of 0.120 inch, 5 parts by weight of a hydroxy-endblocked symtetrakis-3,3,3-trifluoropropyltetramethyltetrasiloxane, 30 parts by weight of a fume silica, 20 parts by weight of diatomaceous earth, 5 parts by weight of a phenylmethylvinylsiloxy-endblocked copolymer consisting of 5 mol percent of phenylvinylsiloxane units, 10 mol percent of dipropylsiloxane units, 5 mol percent of cyclohexylmethylsiloxane units, 40 mol percent phenylmethylsiloxane units and 40 mol percent dimethylsiloxane units having a viscosity of 700,000 cs. at 25° C. and 2 parts by weight of m-dinitrosobenzene.

EXAMPLE 11

When the dimethylpolysiloxane gum of Example 1, (B), is replaced by a copolymer consisting of 40 mol percent ($NCCH_2CH_2CH_2$)($CH_3$)$SiO$ units and 60 mol percent ($CH_3$)$_2$$SiO$ units, equivalent results are obtained.

EXAMPLE 12

When 100 g. of a polyphenylmethylsiloxane fluid having a viscosity of 100,000 cs. at 25° C. is mixed with a 10 g. of m-dinitrosobenzene and thereafter heated for 5 minutes at 250° C., a rubber solid is obtained.

EXAMPLE 13

When 100 g. of a polydimethylsiloxane gum having 90 mol percent dimethylsiloxane units and 10 mol percent monomethylsiloxane units is mixed with 0.1 g. of 2,5-dinitrosotoluene and thereafter heated for 24 hours at 100° C., a rubbery solid is obtained.

EXAMPLE 14

When 100 g. of a polydimethylsiloxane fluid having an average of 18 dimethylsiloxane units per molecule and 2 vinyldimethylsiloxane units per molecule is mixed with 5 g. of p-dinitrosobenzene, a curable composition is obtained.

EXAMPLE 15

When 100 g. of a polydimethylsiloxane fluid having an average of 38 dimethylsiloxane units per molecule and 2 trimethylsiloxane units per molecule is mixed with 3 g. of dinitrosonaphthalene a curable composition is obtained.

EXAMPLE 16

When 100 g. of a polydimethylsiloxane gum containing 2 mol percent monomethylsiloxane units is mixed with 0.001 g. of p-dinitrosobenzene and thereafter heated for 20 hours at 275° C., a rubbery solid is obtained.

EXAMPLE 17

When the composition of Example 1 is heated for 10 hours at 150° C., equivalent results are obtained.

EXAMPLE 18

When 100 g. of a polydiethylsiloxane gum is mixed with 10 g. of p-dinitrosobenzene and thereafter press vulcanized for 6 hours at 225° C., a rubbery solid is obtained.

EXAMPLE 19

When 350 g. of a polydiorganosiloxane gum having 60 mol percent phenylmethylsiloxane units, 30 mol percent dimethylsiloxane units, 9.5 mol percent diphenylsiloxane units and 0.5 mol percent phenyldimethylsiloxane units is mixed with 17 g. of m-dinitrosobenzene and thereafter heated for 20 hours at 200° C., a rubbery solid is obtained.

That which is claimed is:

1. A curable composition consisting essentially of dimethylpolysiloxane having a general unit formula

$$R_nSiO_{4-n/2}$$

wherein R is a methyl radical and n has an average value of 1.98 to 2.05 inclusive and at least 0.001 up to 15 weight percent based on the weight of the dimethylpolysiloxane of a dinitroso aromatic compound.

2. The curable composition according to claim 1 wherein the dinitroso aromatic compound is p-dinitrsobenzene.

3. The curable composition of claim 1 wherein the dinitroso aromatic compound is present in an amount of 0.1 to 10 inclusive weight percent based on the weight of the dimethylpolysiloxane.

References Cited

UNITED STATES PATENTS

| | | | |
|---|---|---|---|
| 2,419,976 | 5/1947 | Trepagnier et al. | 260—85.1UX |
| 2,616,876 | 11/1952 | Rehner et al. | 260—83.3 |
| 2,922,804 | 1/1960 | Kuckro | 260—435 |
| 2,975,203 | 3/1961 | Bailey et al. | 260—46.5U |
| 3,061,594 | 10/1962 | Kuckro | 260—79.5 |
| 3,234,174 | 2/1966 | Williams | 260—46.5(G)X |

OTHER REFERENCES

Alliger et al.: Vulcanization of Elastomers; Reinhold Publishing Corp., 1964, pp. 127 and 128; Sci. Lib.

Vanderbilt: Rubber Handbook, R. T. Vanderbilt Company, Inc., 1958, pp. 382 and 383; Sci. Lib.

MORRIS LIEBMAN, Primary Examiner

L. T. JACOBS, Assistant Examiner

U.S. Cl. X.R.

260—37